Dec. 29, 1925.                     1,567,900
M. E. BIGELOW
TRAP
Filed June 3, 1924
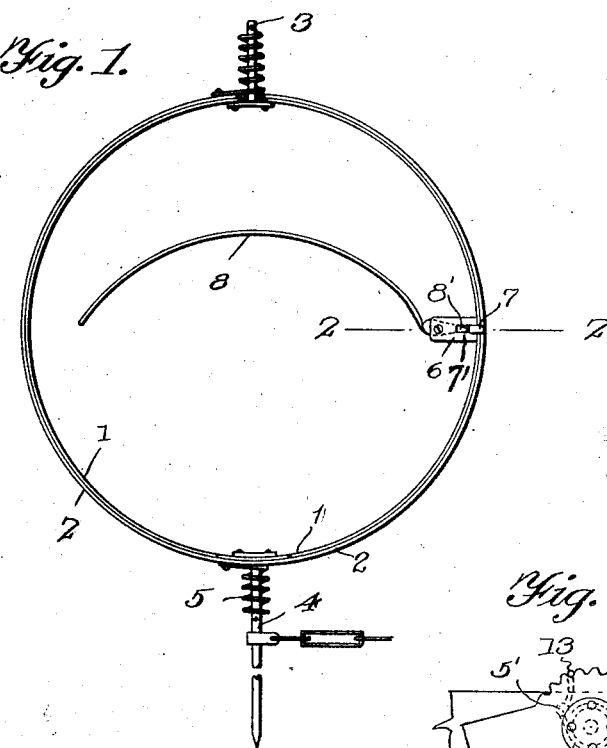
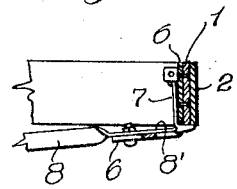
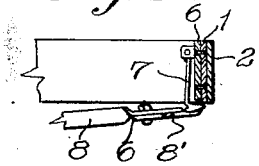
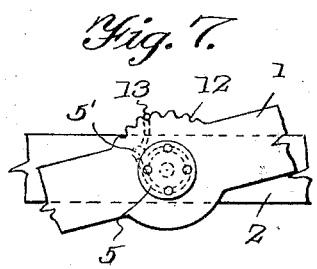
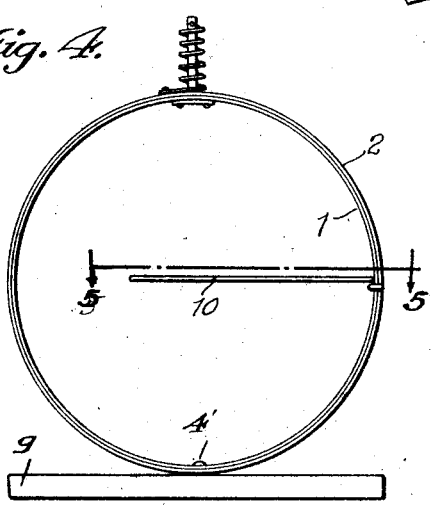
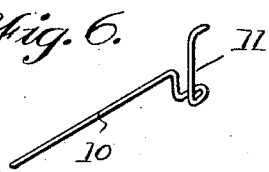
M. E. Bigelow
INVENTOR
BY Victor J. Evans
ATTORNEY
WITNESS:

Patented Dec. 29, 1925.

1,567,900

UNITED STATES PATENT OFFICE.

MERLE E. BIGELOW, OF MILFORD CENTER, OHIO.

TRAP.

Application filed June 3, 1924. Serial No. 717,650.

*To all whom it may concern:*

Be it known that I, MERLE E. BIGELOW, a citizen of the United States, residing at Milford Center, in the county of Union and State of Ohio, have invented new and useful Improvements in Traps, of which the following is a specification.

This invention relates to a trap for catching animals of various kinds, the general object of the invention being to make the trap with two ring-like jaws with spring means for rotating one jaw in relation to the other so as to catch an animal between them.

Such a trap will act to catch a part of the animal's body which may be at a distance from the trap and force it against the stationary jaw, thus catching animals which usually escape from ordinary traps due to their quickness in jumping away from the trap.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the trap.

Figure 2 is a section on line 2—2 of Figure 1.

Figure 3 is a similar view but showing the trigger parts in releasing position.

Figure 4 is an elevation showing a modification.

Figure 5 is a section on line 5—5 of Figure 4.

Figure 6 is a perspective view of the trigger member of this modification.

Figure 7 is a detail view showing ratchet mechanism for holding the two jaws together.

In these views, 1 indicates the inner jaw and 2 the outer jaw, these jaws being of ring form. A pin 3 and a pin 4 are carried by the jaw 1 and pass through holes in the jaw 2, the lower pin 4 being provided with a point so that it can be driven into the ground to support the trap. Springs 5 are placed on the pins and have their ends connected with the pins and with the outer jaw 2 so that when the jaw 2 is rotated the springs will be placed under tension and will tend to return the jaw 2 to its original position. A bracket 6 is carried by the jaw 1 and a latch member 7 is pivoted to said bracket and has a right angled disposed end formed thereon to engage the jaw 2 to hold the same over the jaw 1 with the springs under tension. A trigger 8 is pivoted to the bracket and has a part 8' arranged to hold the latch member in latching position. The main part of this trigger is of curved formation and extends across the opening formed by the trap so that an animal attempting to pass through the trap will move the trigger so as to release the latch member and thus the springs will revolve the outer jaw so as to catch the animal between said outer jaw and the inner jaw and kill the same. By forming the trigger as shown, it may be reversed from the position shown in Figure 1 so that an animal will pass over it instead of under it.

In the modification shown in Figure 4 the pin 4' is connected with a base 9 and but a single spring is used. This figure and Figures 5 and 6 show a trigger member 10 formed of wire which is bent at one end to form the U-shaped gripping part 11 for engaging the two jaws to hold them in locked position. In this case the animal attempting to pass through the trap will push the trigger member to one side and thus force the U-shaped part off the jaws and thus permit the spring to close the trap upon the animal.

The trap can be placed in the runways of animals, so that they will pass through it or the trap can be baited in the usual manner. As will be seen the movable jaw will reach out and pull the animal into the trap and it will catch an animal coming from either side.

In Figure 7 I show ratchet means for preventing the animal from forcing the trap open and thus escaping. This mechanism consists of the teeth 12 formed on an enlargement at the base of the jaw 1 and a pawl 13 which is connected with the base of the jaw 2 and is designed to engage the teeth. As shown this pawl is formed from an extension of the spring 5 which is fastened to the jaw 2 at 5'. These parts are so arranged that the jaws will be closed by the spring upon the animal and they will act to prevent the jaws from being opened by the struggles of the animal to escape.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A trap of the character described comprising a pair of ring-shaped members placed one within the other, diametrically oppositely disposed pins carried by the inner member and passing through the outer member, a coil spring surrounding one of said pins and having its end convolutions thereof fixed to the pin and the outer member respectively, the other of said pins being adapted to support the trap in an upright position, a bracket carried by the inner member and disposed at right angles with respect to the pin, a latch member on the bracket and being provided with a right angled extension for engaging the members for holding them together with the spring under tension, a trigger member pivoted to the bracket for holding the latch member in set position, a ratchet means for preventing an animal caught in the trap from opening the same and a chain secured to the other of said pins.

In testimony whereof I affix my signature.

MERLE E. BIGELOW.